United States Patent
Bacher et al.

(10) Patent No.: US 10,270,596 B2
(45) Date of Patent: *Apr. 23, 2019

(54) GENERATING MEMORY DUMPS

(71) Applicant: INTERNATIONAL BUSINESS MACHINES CORPORATION, Armonk, NY (US)

(72) Inventors: Utz Bacher, Dettenhausen (DE); Reinhard T. Buendgen, Tuebingen (DE); Heiko Carstens, Boeblingen (DE); Dominik Dingel, Boeblingen (DE)

(73) Assignee: INTERNATIONAL BUSINESS MACHNINES CORPORATION, Armonk, NY (US)

( * ) Notice: Subject to any disclaimer, the term of this patent is extended or adjusted under 35 U.S.C. 154(b) by 231 days.

This patent is subject to a terminal disclaimer.

(21) Appl. No.: 15/267,188

(22) Filed: Sep. 16, 2016

(65) Prior Publication Data
US 2018/0081824 A1 Mar. 22, 2018

(51) Int. Cl.
*H04L 29/06* (2006.01)
*H04L 9/30* (2006.01)
(Continued)

(52) U.S. Cl.
CPC .......... *H04L 9/30* (2013.01); *G06F 9/45558* (2013.01); *G06F 12/1408* (2013.01);
(Continued)

(58) Field of Classification Search
CPC .......... G06F 12/14; G06F 9/45558; G06F 2212/1052; G06F 2009/45591; G06F 2009/45583; H04L 9/0822; H04L 9/30; H04L 9/3271; H04L 9/14; H04L 9/3247
See application file for complete search history.

(56) References Cited

U.S. PATENT DOCUMENTS 8,621,282 B1* 12/2013 Mixter ............... G06F 11/0706
714/38.11
8,782,351 B2 7/2014 Arges et al.
(Continued)

OTHER PUBLICATIONS

IBM: List of IBM Patents of Patent Applications Treated as Related (Appendix P), Feb. 19, 2018, pp. 1-2.
(Continued)

*Primary Examiner* — Tri M Tran
(74) *Attorney, Agent, or Firm* — Erik K. Johnson

(57) ABSTRACT

A method for generating a dump comprising data generated by a virtual system in a computing environment is depicted. The method comprises: initiating a dump process for dumping data generated by the virtual system and stored in guest memory; sending a dump request for the data from the virtual machine monitor to the trusted component; in response to receiving the dump request, generating a symmetric dump generating key; reading the data from the guest memory; encrypting the data with the symmetric dump generating key; encrypting the symmetric dump generating key with the public cryptographic key of the client system; providing the encrypted dump data and the encrypted symmetric dump generating key to the virtual machine monitor; generating a dump comprising the encrypted dump data and the encrypted symmetric dump generating key; and providing the dump to the client system.

18 Claims, 8 Drawing Sheets

(51) Int. Cl.
*G06F 9/455* (2018.01)
*H04L 9/32* (2006.01)
*H04L 9/08* (2006.01)
*H04L 9/14* (2006.01)
*G06F 12/14* (2006.01)
*G06F 21/00* (2013.01)

(52) U.S. Cl.
CPC ............ *G06F 21/00* (2013.01); *H04L 9/0822* (2013.01); *H04L 9/0894* (2013.01); *H04L 9/14* (2013.01); *H04L 9/3247* (2013.01); *H04L 9/3271* (2013.01); *G06F 2009/45583* (2013.01); *G06F 2009/45587* (2013.01); *G06F 2009/45591* (2013.01); *G06F 2212/1052* (2013.01)

(56) References Cited

U.S. PATENT DOCUMENTS

| | | |
|---|---|---|
| 8,812,871 B2 | 8/2014 | Monclus et al. |
| 9,026,773 B2 | 5/2015 | Zimmer et al. |
| 9,454,662 B1 | 9/2016 | Buendgen et al. |
| 9,547,605 B2 | 1/2017 | Yu et al. |
| 2006/0026042 A1* | 2/2006 | Awaraji ................ G06F 19/322 705/3 |
| 2011/0225459 A1* | 9/2011 | Fahrig .................. G06F 11/366 714/37 |
| 2011/0302400 A1* | 12/2011 | Maino ................... G06F 21/575 713/2 |
| 2012/0179904 A1 | 7/2012 | Dunn et al. |
| 2014/0007191 A1* | 1/2014 | Hu ....................... G06F 21/6245 726/3 |
| 2014/0208097 A1* | 7/2014 | Brandwine ........... H04L 9/3263 713/156 |
| 2015/0149830 A1 | 5/2015 | Escobar Olmos et al. |
| 2017/0111354 A1 | 4/2017 | Buendgen et al. |

OTHER PUBLICATIONS

Bacher et al., Pending U.S. Appl. No. 15/898,936, filed Feb. 19, 2018, titled "Generating Memory Dumps," pp. 1-27.

\* cited by examiner

GENERATING MEMORY DUMPS

BACKGROUND

The present invention relates to a method for generating a memory dump comprising data being generated by a virtual system in a trustable computing environment.

Computer system virtualization allows executing virtual systems in a protected environment of a virtual machine monitor. The virtual machine monitor is also called hypervisor. The virtual system is generated by a client system and provided for execution to the virtual machine monitor. The virtual machine monitor facilitates the protected environment provided from a trusted component as a runtime environment for the virtual system. Furthermore, the virtual machine monitor provides a guest memory as a logical portion of a memory of a system on which the virtual machine monitor is installed.

The data generated by the virtual system are stored in the guest memory. The data comprises non-accessible for the virtual machine monitor. Therefore, at least parts of the data are encrypted with a program key of the virtual system. Alternatively, or additionally, the non-accessible data may be stored in protected memory areas which are protected against access by the virtual machine monitor.

In summary, the virtual system is executed on the virtual machine monitor but the data managed and generated by the virtual system are protected against access of the virtual machine monitor. Therefore, a virtual system can be executed without having trust to the virtual machine monitor. The virtual machine monitor has no access permission to the data managed and processed by the virtual system.

In case an error or a problem occurs during execution of the virtual system, a copy of the data stored in the guest memory should be generated and provided to the client system in order to analyze the error or problem. The client system realizes that an error occurs and starts a minimal operating system in place. This operating system is configured for initiating a memory dump process. The memory dump is then provided to the client system.

Since the data are at least partly accessible by the hypervisor, the hypervisor is not able to generate a complete copy of the memory. Therefore, the memory dump has to be generated by the virtual machine system. If the virtual machine system is not able to start the minimal operation system for generating a memory dump, the memory dump cannot be generated.

Furthermore, there is no out-of-band control to the dump, for example via a user interface of the client system, the hypervisor or a service provider.

The above mentioned reasons lead to a degraded serviceability of the system compared to traditional system not using such protected schemes.

SUMMARY

According to embodiments of the invention, a method for generating a memory dump comprising data being generated by a virtual system in a computing environment is provided.

The computing environment comprises: a virtual machine monitor operatively coupled to a client system, a trusted component, and a memory.

The client system is configured for providing the virtual system in the form of an image to the virtual machine monitor and has an asymmetric cryptographic key pair comprising a private cryptographic key and a public cryptographic key.

The virtual machine monitor is configured for providing a protected environment for executing the virtual system provided by the client system and for declaring a guest memory as a logical portion of the memory, the data generated by virtual system being stored in the guest memory.

The trusted component is configured for accessing the data in the guest memory. Furthermore, the public cryptographic key of the client system is provided to the trusted component. The public cryptographic key is cryptographically linked with the virtual system.

The method comprises initiating a dump process for dumping data being generated by the virtual system and stored in the guest memory; sending a dump request for the data from the virtual machine monitor to the trusted component; in response to receiving the dump request, generating a symmetric dump generating key by the trusted component; reading the data from the guest memory by the trusted component; encrypting the data with the symmetric dump generating key by the trusted component; encrypting the symmetric dump generating key with the public cryptographic key of the client system by the trusted component; providing the encrypted dump data and the encrypted symmetric dump generating key to the virtual machine monitor by the trusted component; generating a dump comprising the encrypted data and the encrypted symmetric dump generating key by the virtual machine monitor, and providing the dump to the client system by the virtual machine monitor.

In further aspects of the invention, a computing environment is provided. The environment comprises: a virtual machine monitor operatively coupled to a client system, a trusted component, and a memory.

The client system is configured for providing the virtual system in the form of a system virtual system image to the virtual machine monitor and has an asymmetric cryptographic key pair comprising a private cryptographic key and a public cryptographic key. The public cryptographic key is cryptographically linked with the virtual system.

The virtual machine monitor is configured for providing a protected environment for executing the virtual system provided by the client system and for declaring a guest memory as a logical portion of the memory, the data generated by virtual system being stored in the guest memory; sending a dump request for the data from the virtual machine monitor to the trusted component; generating a dump comprising the encrypted data and the encrypted symmetric dump generating key by the virtual machine monitor; and providing the dump to the client system by the virtual machine monitor.

The trusted component has access to the public cryptographic key of the client system and is configured for in response to receiving the dump request, generating an individual symmetric dump generating key for the dump; accessing the data from the guest memory; encrypting the data with the symmetric dump generating key; encrypting the symmetric dump generating key with the public cryptographic key of the client system; and providing the encrypted dump data and the encrypted symmetric dump generating key to the virtual machine monitor.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

Figure 1:
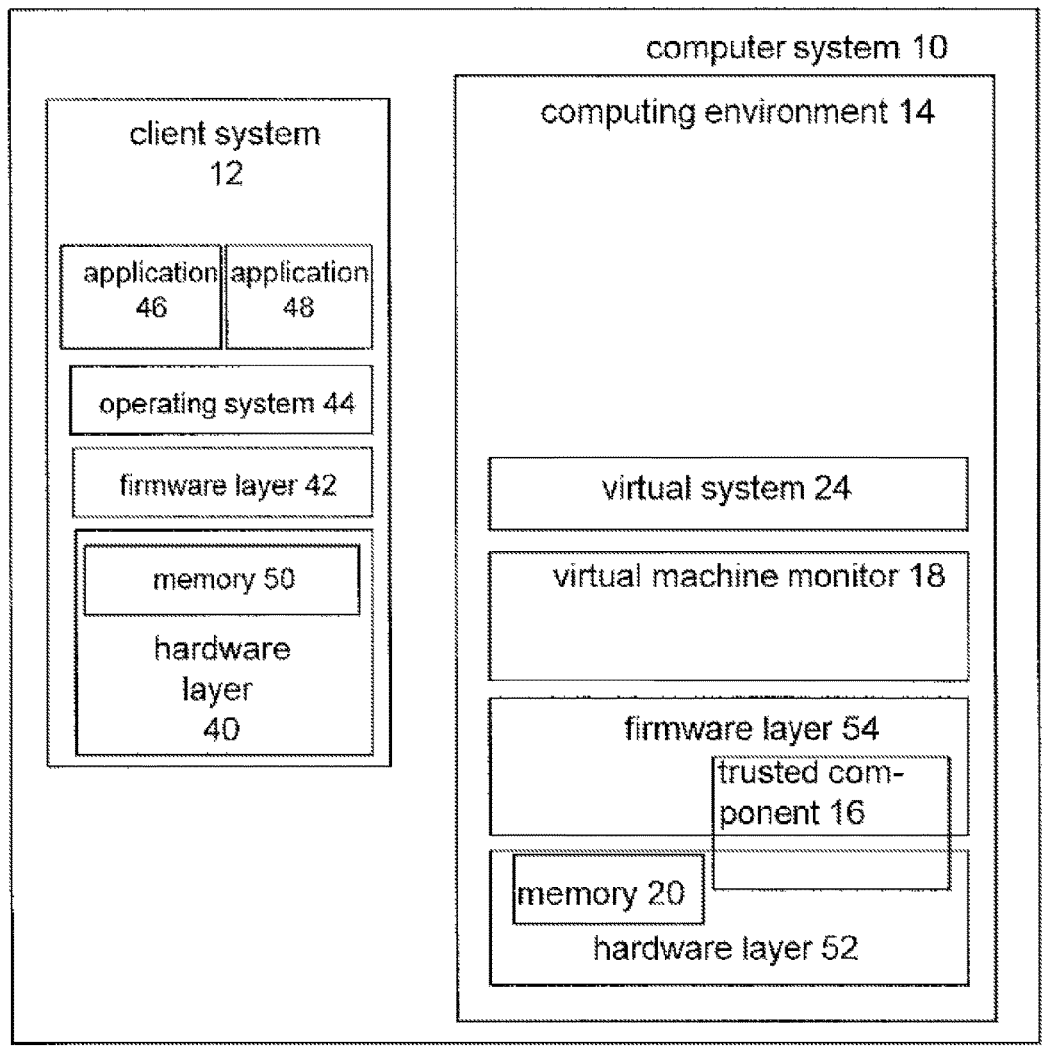
FIG. 1 shows a schematic overview of the layers of a computer system.

According to the invention an additional trustable component is provided for reading the data from the guest memory. The trusted component is a shim layer which marshals necessary access from the virtual machine monitor to the virtual system to only provide what is necessary to execute the virtual system of the client system without giving away unnecessary data of the client system. The trusted component is certified with a special reliability which allows the trusted component to read data of the client system.

The trusted component can be provided in the server system but is separated from the virtual machine monitor. For example, the trusted component may be located on a read-only memory associated to the firmware of the computing environment. The trusted component is not configured for directly communicating with the client system so that the communication takes place via the virtual machine monitor. Furthermore, the trusted component is not configured for executing the virtual system of the client system but to assist the virtual machine monitor in its task to execute the virtual machine.

Embodiments of the invention may have the advantage that a reliable data transmission of the data from the guest memory to the client system is ensured. The data are sent via the virtual machine monitor, whereby the data cannot be read by the virtual machine monitor in an unencrypted form.

The data of the dump are only provided encrypted to the virtual machine monitor. Since the symmetric dump generating key for decrypting the data is encrypted with the public cryptographic key of the client system, the symmetric dump generating key cannot be used by the virtual machine monitor for decrypting the data.

The encrypted symmetric dump generating key can only be decrypted by the client system with the private cryptographic key. After decrypting the symmetric dump generating key, the client system is able to decrypt the data with the symmetric key. Therefore, the data can be stored and processed by the virtual machine monitor without being accessible to the virtual machine monitor in unencrypted form.

The data may comprise accessible and non-accessible data for the virtual machine monitor. The non-accessible data and registers are stored in encrypted form and/or stored in a protected memory area of the guest memory. The accessible data are stored in unencrypted form and/or stored in a non-protected memory area of the guest memory. The method may further comprise the trusted component determining whether the data to be stored are accessible or non-accessible data, the trusted component encrypting the non-accessible data and making the encrypted non-accessible data accessible to the virtual machine monitor, and the trusted component returning references to the accessible data unencrypted to the virtual machine monitor.

In case the accessible data are encrypted, these data are present in unencrypted and encrypted form. This may increase the risk of decrypting the non-accessible data. Since only the non-accessible data are encrypted, a decryption of the non-accessible data is more difficult. Therefore, these features may improve the security of the non-accessible data and the protection of the non-accessible data.

These features may reduce the data traffic between the trusted component and the memory as well as between the trusted component and the virtual machine monitor and lead to a faster dumping process.

Furthermore, a description may be provided that restrict the memory areas to be read by the trusted component. The description may comprise a positive list of memory areas permitted for reading by the trusted component or a negative list of memory areas not permitted for reading by the trusted component.

Alternatively, a more complex description scheme of data permitted or not permitted for reading by the trusted component may be provided. This may reduce the data to be read for generating the dump and therefore may reduce the memory space required for the dump. Furthermore, the privacy of a person using the virtual system may be increased. For example, personal data of the person are excluded from generating the dump.

After sending the dump request to the trusted component, the trusted component may generate a header of the data to the stored. The header may comprise the encrypted dump generating key, a list of the encrypted dump data to be stored, the size of the encrypted data to be stored and possibly a list of unencrypted dump data and the size of the unencrypted dump data. The trusted component may send the header to the virtual machine monitor. The virtual machine monitor may send the header and the data to the client system after all data according to the header being accessible to the virtual machine monitor. The header comprises essential information of the memory dump. The data can be read from the memory, encrypted by the trusted component and provided to the virtual machine monitor in packages of single pages. The advantage of reading, encrypting and providing of individual packages or single page is that these processes can adjusted to the processor load of the server system. The packages or pages may be read one after another or simultaneously. Since the header comprises all essential information about the dump, the virtual machine monitor is able to determine whether all data are read from the memory and the dump process is finished.

Prior to initiating the dump process, a virtual system in form of an encrypted image and a wrapped symmetric key may be provided to the virtual machine monitor by the client system. The wrapped symmetric key is used to encrypt the image and is wrapped by an asymmetric public key deployed in the trusted component. Furthermore, a protected environment may be generated as a runtime environment for the virtual system by the virtual machine monitor, the guest memory may be generated by the virtual machine monitor. The virtual machine monitor may pass the encrypted image from the virtual machine monitor to the trusted component.

The trusted component is able to extract the wrapped symmetric key and is able to decrypt the image. The virtual system may be executed by the virtual machine monitor with support of the trusted component in case the encryption was performed successfully and the data generated by the virtual system may be stored in the guest memory.

In further embodiments, the trusted component may have an asymmetric cryptographic trusted component key pair comprising of a private trusted component key and a public trusted component key. The cryptographic link between the public cryptographic key of the client system and the virtual system being provided to the trusted component 16 may be established by the client by generating a client key by the client system, encrypting or signing an image of the virtual system with the client key by the client system, encrypting the client key with the public trusted component key by the client system, sending the encrypted or signed image and the encrypted client key from the client system to the virtual machine monitor, passing the encrypted image and the encrypted client key from the virtual machine monitor to the trusted component when providing a protected execution environment for the virtual server, decrypting the encrypted client key by the trusted component, decrypting the encrypted image and storing it in the non-accessible logical portion of the memory if the encrypted image is passed the trusted component, encrypting or signing the public cryptographic dump key with the client key by the client system before initiating the dump storing process the first time, sending the encrypted or signed public cryptographic dump key from the client system to the virtual machine monitor, passing the encrypted or signed public cryptographic dump key to the trusted component by the virtual machine monitor, decrypting the encrypted public cryptographic dump key using the client key by the trusted component, and verifying the signature of the signed public cryptographic key using the client key and in case of failing verification refusing to support subsequent dump storing processes of the virtual system by the trusted component.

In some embodiments, the client system may send a dump request for initiating the dump process to the virtual machine monitor. The virtual machine monitor may pass the request from the virtual machine monitor to the trusted component.

Alternatively, the virtual machine monitor may generate a dump request for initiating the dump process.

After receiving the dump request from the virtual machine monitor, the trusted component may initiate a challenge-response authentication with the client system. The challenge-response authentication may use the private and the public cryptographic key of the client system. The dump process may only be performed, if the challenge-response authentication is successfully performed. For example, any request for generating a dump needs to be signed by the private cryptographic key of the client system.

Alternatively, or additionally, the trusted component may comprise a counter for the dumps generated by the virtual machine monitor and a maximum number of dumps may be defined. The dump process may only be executed if the number of dumps generated by the virtual machine monitor is less than or equal to the maximum number of dumps.

This may reduce attacks on multiple dumps of the client system. In case dumps are generated in quick succession, the dumps may have only slightly changed contents which may give hints for decrypting the dumps. Therefore, the number of dumps to be generated may be limited. Additionally, the number of dumps to be generated in a defined time period may be limited or the minimum time period between generating two dumps is restricted in order to avoid multiple dump attacks.

The counter may be deactivated in order to ensure that a dump can be generated if necessary. For example, the client system may be configured for providing an authenticated request by the client system 12 for deactivating the counter in the trusted component. The deactivating of the counter may comprise generating a challenge-response-process between the client system and the trusted component.

The trusted component may be configured for determining whether the data to be stored are accessible or non-accessible data, for encrypting the non-accessible data and making the encrypted non-accessible data accessible to the virtual machine monitor, and for returning references to the accessible data unencrypted to the virtual machine monitor.

In further embodiments, the trusted component may be configured for generating a header of the data to the stored after receiving the dump request, the header comprising the encrypted dump generating key, a list of the encrypted data to be stored, the size of the encrypted data to be stored and possibly a list of unencrypted dump data and the size of the unencrypted dump data. The virtual machine monitor may be configured for sending the header and the data to the client system after all data according to the header being accessible to the virtual machine monitor.

The server system may be configured for receiving a virtual system image to be executed and a protected secret from the client system, wherein the secret is cryptographically linked to the image, for generating a protected environment and a guest memory on the trustable computing environment. The memory may comprise protected and non-protected memory areas. Furthermore, the virtual machine monitor may be configured for passing the protected secret from the virtual machine monitor to the trusted component. The trusted component may be able to derive the secret from the protected secret. The trusted component may be configured for performing a consistency check with the secret by the trusted component. The virtual machine monitor is configured for executing the virtual system in case the consistency check being performed successfully and for storing the data generated by the virtual system in the memory of the protected environment.

In further embodiments, the trusted component may have an asymmetric cryptographic trusted component key pair comprising of a private trusted component key and a public trusted component key.

The client system may be configured for generating a symmetric client key, encrypting an image of the virtual system image with the client key, encrypting the client key with the public trusted component key, sending the encrypted image and the encrypted client key from the client system to the virtual machine monitor, encrypting the public cryptographic key with the client key before initiating the dump storing process the first time, sending the encrypted public cryptographic key from the client system 12 to the virtual machine monitor.

The virtual machine monitor may be configured for: passing the encrypted image and the encrypted client key to the trusted component when providing a protected execution environment for the virtual server, passing the encrypted public cryptographic key to the trusted component by the virtual machine monitor.

The trusted component being configured for decrypting the encrypted client key, decrypting the encrypted image and storing it in the logical portion of the memory if the encrypted image is passed the trusted component, decrypting the encrypted public cryptographic key using the client key by the trusted component.

The client system may be configured for sending a dump request for initiating the dump process.

Alternatively, or additionally, the virtual machine monitor may be configured for generating a dump request for initiating the dump process to the virtual machine monitor and the virtual machine monitor may be configured for passing the request from the virtual machine monitor to the trusted component.

The trusted component may be configured for initiating a challenge-response authentication with the client after receiving the dump request from the virtual machine monitor. The challenge-response authentication may use the private and the public cryptographic key of the client system. The dump process may only be performed in case the challenge-response authentication is successfully performed.

In further embodiment, the trusted component may comprise a counter for the dumps generated by the virtual machine monitor. A maximum number of dumps may be defined and the dump process may only be executed if the number of dumps generated by the virtual machine monitor is less than or equal to the maximum number of dumps.

Furthermore, the client system may be configured for providing an authenticated request by the client system for deactivating the counter in the trusted component.

Hereinafter, a computer system 10 comprising a client system 12 and a trustable computing environment 14 and a method for generating a dump in the trustable computing environment 14 are described.

Figure 2:
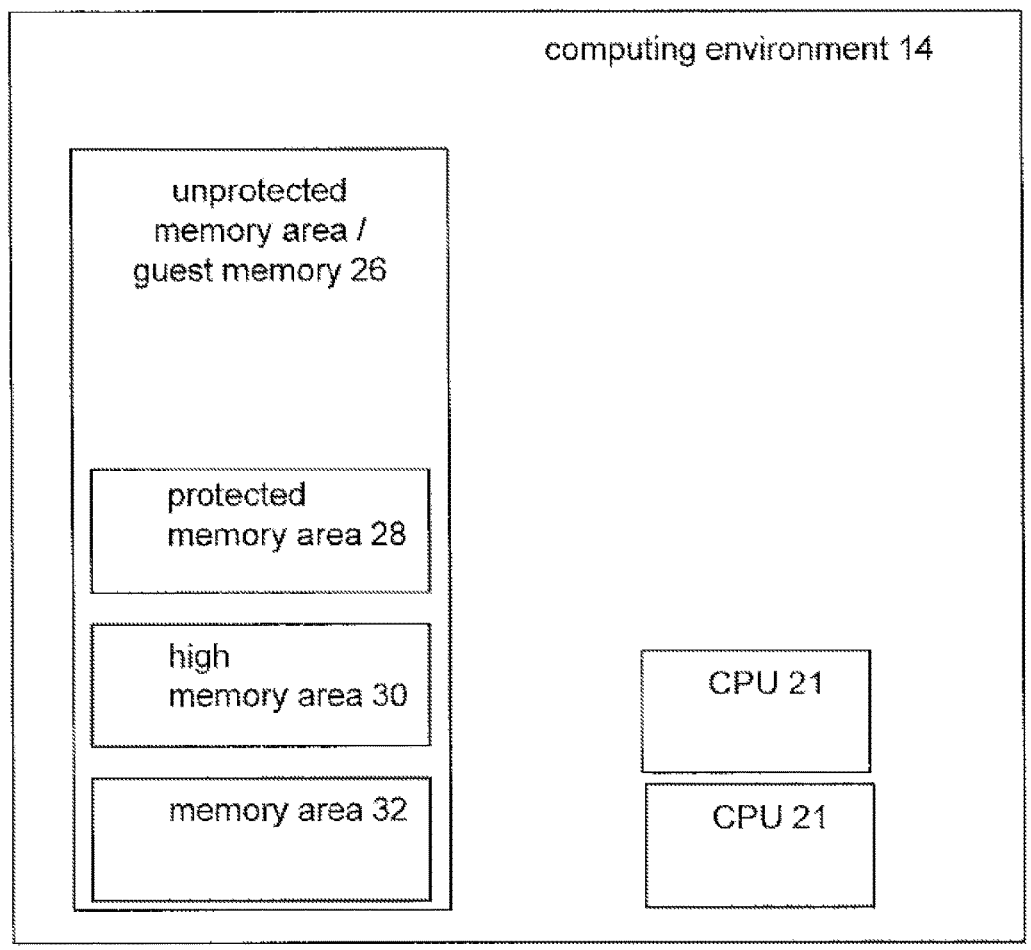
FIG. 2 shows a schematic physical overview of a computing environment of the computer system according to FIG. 1.
Figure 3:
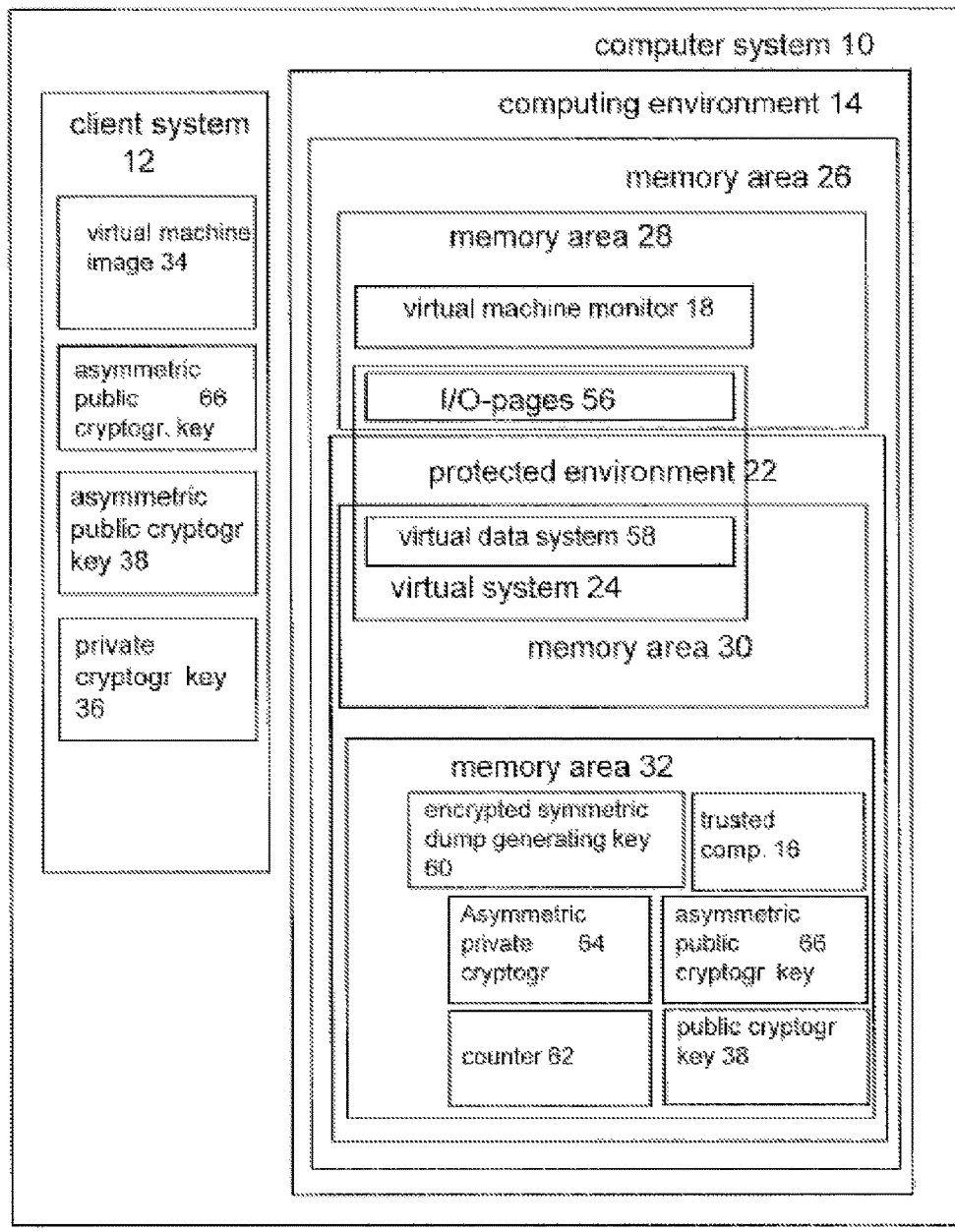
FIG. 3 shows a schematic overview of the positioning of the resources of the computer system according to FIG. 1.

The trustable environment 14 comprises a hardware layer 52, a firmware layer 54, a virtual machine monitor 18 and a virtual system 24 which is executed by the virtual machine monitor 18. Furthermore, a trusted component 16 is provided in the hardware layer 40 and the firmware layer 42. The hardware layer 52 comprises a memory 20 and several Central Processing Units (CPU) 21. The memory 20 comprises memory areas 28, 30, 32 having different security or access levels. A first memory area 26 is unprotected. A second memory area 28 is a protected memory area. A third memory area 30 is a high protected memory area (FIG. 2).

The virtual machine monitor 18 is configured for providing a protected environment 22 as a runtime environment for the virtual system 24, whereby the virtual machine monitor 18 has no access to the protected environment 22 and therefore has no access permission to the data managed and processed by the virtual system 24.

Furthermore, the virtual machine monitor 18 is configured for establishing a connection between the client system 12 and the virtual machine monitor 18 as well as a connection between the virtual machine monitor 18 and the trusted component 16.

For storing the data managed and processed by executing the virtual system 24, the virtual machine monitor 18 is configured for generating a guest memory 26 as a logical portion of the memory 20 for storing data generated in conjunction with the execution of the virtual system 24.

The data has different access levels. Input/output-data (I/O-pages) 56 generated by the virtual machine monitor 18 in conjunction with the execution of the virtual system 24 are stored in the first, unprotected memory area 26. These pages do not contain any non-accessible data for the virtual machine monitor 18, for example data of the user. Therefore, these pages respectively this memory area 28 is not protected and therefore accessible to the virtual machine monitor 18 as well as to the virtual system.

Virtual data system 58 which has to be protected against reading by the virtual machine monitor 18 are stored in the second, protected memory area 28.

Data owned by the virtual machine monitor 18 may be stored in a further memory area which is configured for access of the virtual machine monitor 18 only.

The trusted component 16 is stored in the memory area 32 with the highest security level. Furthermore, in this memory area 32 an asymmetric public cryptographic key 38 of the client system 12, an asymmetric private cryptographic 64 as well as an asymmetric public cryptographic key 66 of the trusted component 16 and a counter 62 for the number of generated dumps are stored. For example, the public cryptographic key 38 of the client system 12 is provided to the server system 14 whilst the connection between the client system 12 and the server system 14 is established the first time. Furthermore, an individually generated symmetric dump generating key 60 may be stored in the memory area 32.

The trusted component 16 is a shim layer which marshals necessary access from the virtual machine monitor 18 to the virtual system 24 to only provide what is necessary to execute the virtual system 24 without giving away unnecessary data of the client system 12 to the virtual machine monitor 18. The trusted component 16 is certified with a special reliability which allows the trusted component 16 to read data of the client system 12. The trusted component is not configured for executing a virtual system 24 of the client system 12 or for generating dumps.

The trusted component has access to all memory area 28, 30, 32 respectively to all data of the memory areas 28, 30, 32 in unencrypted form.

The client system comprises a hardware layer 40, a firmware layer 42, an operating system (OS) 44 and several applications 46, 48. For example, the application 48 of the client system 12 is a dump analyzing software. Furthermore, the hardware layer 40 comprises a memory 50 in which a virtual machine image 34 to be executed by the computing environment 14, a public cryptographic key 66 of the trusted component 16 and a pair of asymmetric cryptographic keys of the client system 12 comprising a private cryptographic key 36 and a public cryptographic key 38 of the client system 12 are stored. Furthermore, the public cryptographic key 66 of the trusted component 16 is stored in the memory 50. The client system 12 is configured for providing the virtual machine image 34 to the virtual machine monitor 18.

The client system 12 is operatively coupled to the trustable environment 14. For example, the client system 12 is physically separated from the server system 14. For example, the client system 12 is a computer that is able to establish a connection to the server system 14.

Alternatively, the client system 12 may be integrated in a partition or a protected environment 22 of the protected environment 22 or the virtual machine monitor 18. In such an embodiment, a network interface is provided for establishing a connection between a user and the client system 12. For example, the user utilizes a computer for establishing the connection to the client system 12.

The virtual machine monitor 18 is configured for generating a virtual system 24 by executing the virtual machine image 34 provided by the client system 12 in the protected environment 22, whereby the virtual system 24 contents are protected against unencrypted reading by the virtual machine monitor 18.

In case an error occurs while executing the virtual system 24, a dump of the guest memory 26 can be generated in order to analyze the data stored in the guest memory 26 for identifying and correcting any errors in the virtual system 24.

The process for generating a dump may be initiated by the client system 12. The client system 12 is configured for detecting errors of the execution of the virtual system 24. In case an error occurs, the client system 12 initiates the dump process by sending a dump request to the virtual machine monitor 18.

Alternatively, the virtual machine monitor 18 may detect an error of the execution and initiate the dump process.

The virtual machine monitor 18 is configured for collecting the data to be stored in the dump and for generating a dump comprising these data. However, the virtual machine monitor 18 has no access to all data stored in the memory 20 respectively no access to all data in unencrypted form.

Therefore, the virtual machine monitor 18 determines the data to be stored in the dump and sends a request comprising a listing of the data to be stored to the trusted component 16 which is configured for reading the data of the memory areas 28, 30, 32 in unencrypted form.

In the following, the trusted component 16 generate an individual symmetric cryptographic dump generating key 60 for the dump process, wherein for every dump process an individual symmetric cryptographic dump generating key 60 is generated.

In the following, the trusted component 16 generates a header of the dump which comprises all essential information of the dump, especially a list of the data or the pages to be stored in the dump, the size of the dump, additional registers of the data to be stored and the individual symmetric key encrypted by the public cryptographic key 38 of the client system 12.

The trusted component 16 sends the header to the virtual machine monitor 18. The header is stored in the virtual machine monitor 18.

Afterward, the trusted component 16 reads the data and/or pages from the guest memory 26, encrypts the data and/or the page with the generated symmetric dump generating key 60 and provides the encrypted data and/or pages to the virtual machine monitor 18. This process is performed since all data to be stored in the dump are read from the memory 20, encrypted with the symmetric dump generating key 60 and provided to the virtual machine monitor 18. Since the header comprises a list of all data to be stored in the dump, the virtual machine monitor 18 is able to determine whether all data and/or all pages are provided to the virtual machine monitor 18.

Furthermore, the trusted component encrypts the symmetric dump generating key 60 with the public cryptographic key 38 of the client system and provides the encrypted symmetric dump generating key 60 to the virtual machine monitor 18.

After determining that all data and/or page to be stored in the dump and the encrypted symmetric dump generating key 60 are received, the virtual machine monitor 18 generated the dump comprising the received data and/or pages and the encrypted symmetric dump generating key 60.

Afterwards, the virtual machine monitor 18 sends the dump to the client system 12 in which the dump is stored.

For analyzing the data of the dump, the client system 12 decrypts the encrypted symmetric dump generating key 60 with the public cryptographic key 38 of the client system 12. In the following, the client system 12 decrypts the data and/or page with the decrypted symmetric dump generating key 60.

The above described method provides a method for generating a dump by the virtual machine monitor 18, whereby the data are protected against unencrypted access of the dump generating component 60. Since the individual symmetric dump generating key 60 is encrypted with the public cryptographic key 38 of the client system, only the client system 12 is able to decrypt the symmetric dump generating key 60 and to encrypt the data stored in the dump.

Since the virtual machine monitor 18 continues the operation of the virtual system 24, the system resources for managing the data for the dump are limited. Therefore, after receiving the header of the dump, the virtual machine monitor 18 may generate an information comprising the number of data and/or pages which can be processed. The virtual machine monitor 18 sends this information to the trusted component 16. The trusted component 16 provides only a number of data and/or pages that can be processed by the virtual machine monitor 18.

As mentioned above, the guest memory 26 comprises accessible and non-accessible data for the virtual machine monitor 18. The accessible data are stored in a non-protected memory area 26 and the non-accessible data are stored in a protected memory area 28. Since the accessible data are readable by the virtual machine monitor 18, these data may not be encrypted. The trusted component 16 may determine whether the data to be stored are accessible or non-accessible data and may only encrypt the non-accessible data. This may reduce the data traffic and lead to a faster dumping process. Furthermore, the security of the data stored in the dump is ensured. In case, the accessible data that are readable by the virtual machine monitor 18 are additionally encrypted, this would increase the risk for decrypting the encrypted data.

Figure 6:
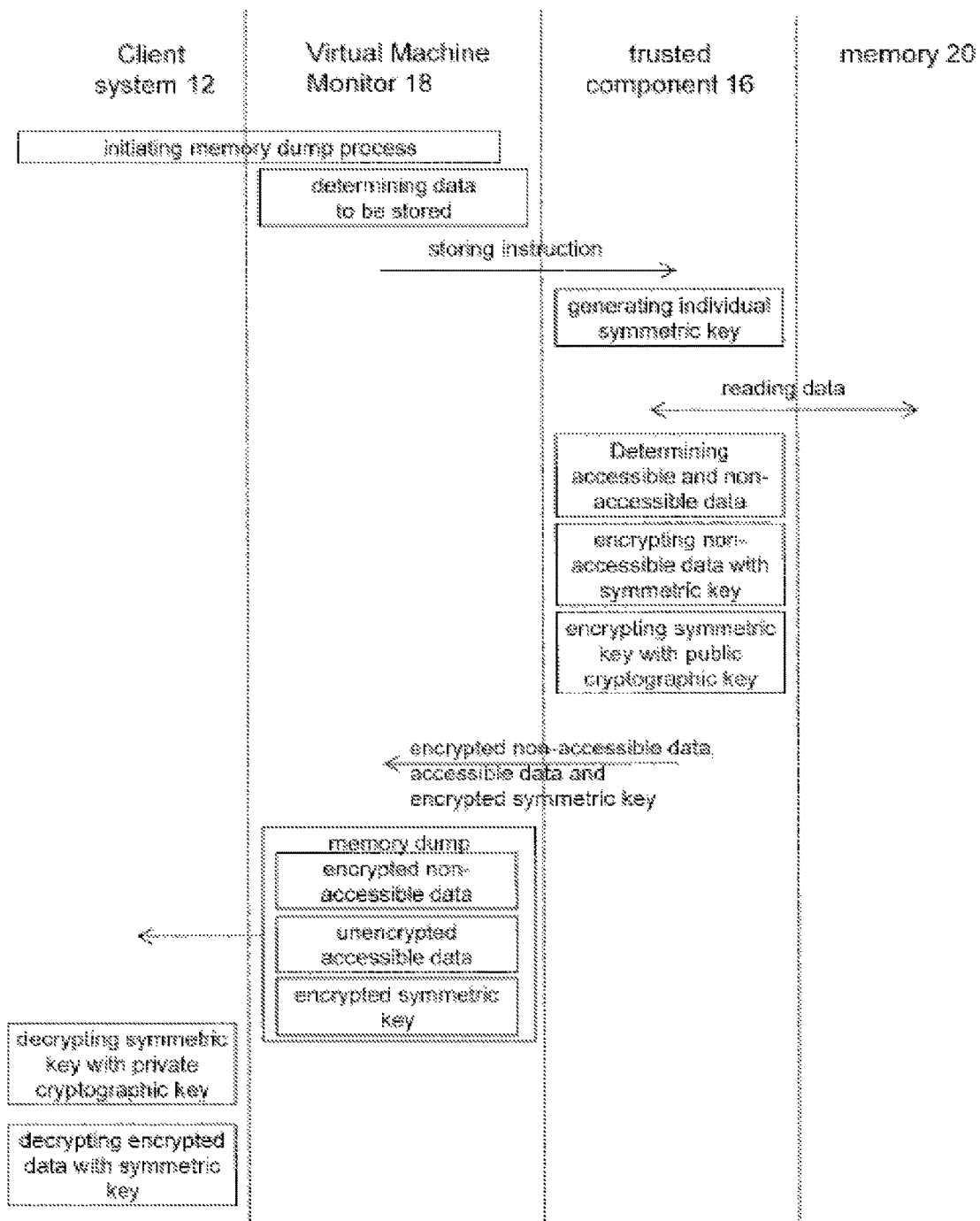
FIG. 6 shows a process diagram of a second embodiment of a method for generating a dump in a computer system according to FIG. 1.
Figure 7:
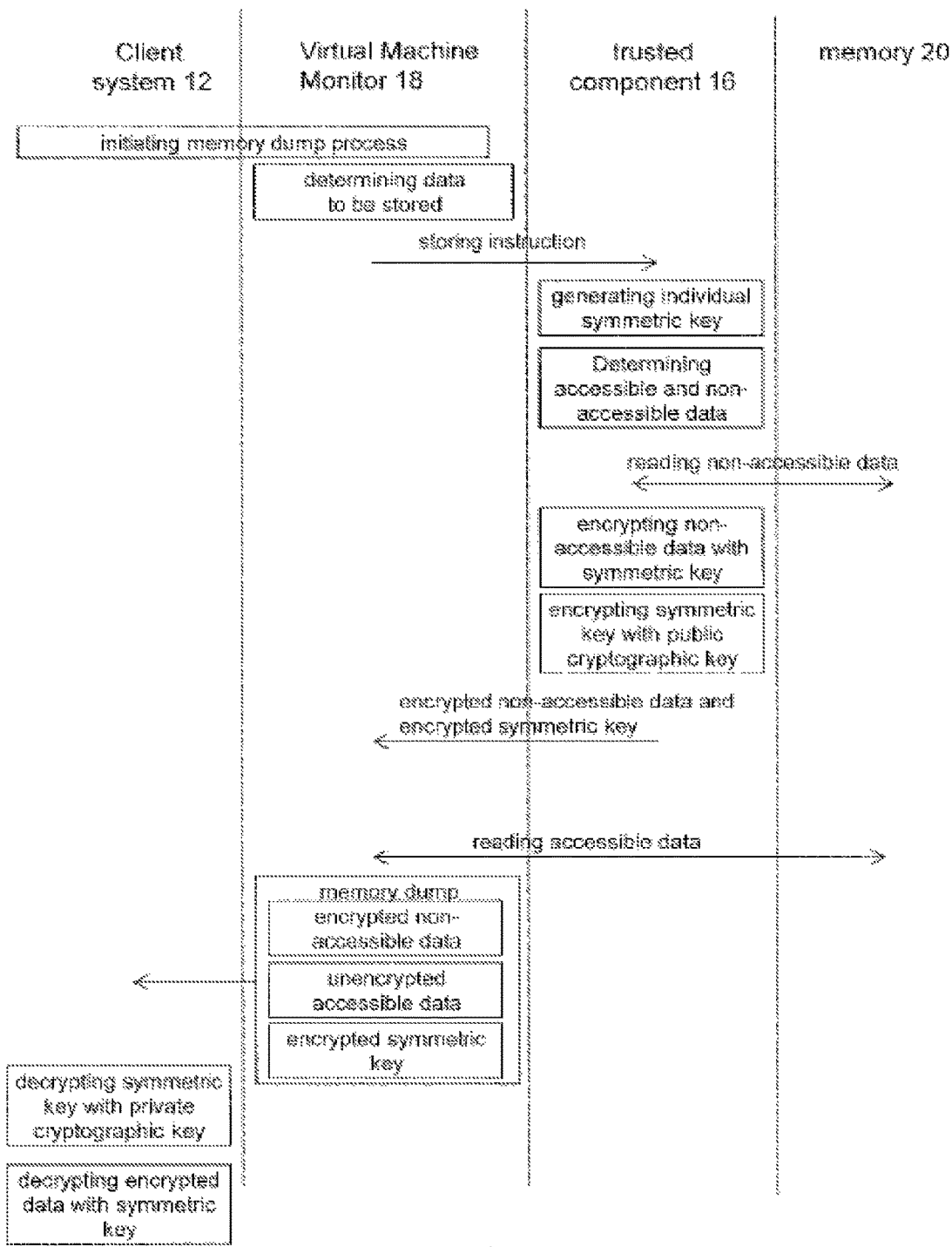
FIG. 7 shows a process diagram of a third embodiment of a method for generating a dump in a computer system according to FIG. 1.

Therefore, the accessible data may be read by the trusted component 16 and send unencrypted to the virtual machine monitor 18 (FIG. 6). In order to reduce the data traffic between the trusted component 16 and the guest memory 26 as well as between the trusted component 16 and the virtual machine monitor 18, the trusted component 16 may send a reading instruction for the accessible data to the virtual machine monitor 18 and the virtual machine monitor 18 reads the accessible data directly from the guest memory 26 (FIG. 7).

Multiple dumps with slightly changing contents may give hints for decrypting the dumps. In order to reduce the risk of attacks on multiple dumps, the trusted component 16 may initiate a challenge-response authentication with the client system 12. The challenge-response authentication may use the private and the public cryptographic key 36, 38 of the client system 12. The reading process and therefore the dump process are only performed, in case the challenge-response authentication is successfully performed.

Another possibility to improve the security is to install a counter for the dumps generated by the virtual machine monitor 18 in the virtual machine monitor 18 and/or the trusted component 16 and defining a maximum number of dumps which are allowed to be generated. The dump process is only executed if the number of dumps generated by the virtual machine monitor 18 is less than or equal to the maximum number of dumps. The counter may comprise a maximum number of dumps in a defined time period.

The counter may be deactivated by the client system 12 with a defined authentication method, for example, a challenge-response authentication.

Furthermore, a description may be provided which restrict the memory areas 28, 30, 32 to be read be the trusted component 16. The description may comprise a positive list of memory areas permitted for reading by the trusted component 16 or a negative list of memory areas 28, 30, 32 not permitted for reading by the trusted component 16. Alternatively, a more complex description scheme of data permitted or not permitted for reading by the trusted component 16 may be provided. This may reduce the data to be read for generating the dump and therefore may reduce the memory space required for the dump. Furthermore, the privacy of a person using the client system may be increased. For example, personal data of the person are excluded from generating the dump.

The trusted component 16 may comprise an asymmetric cryptographic trusted component key pair comprising of a private trusted component key and a public trusted component key.

Figure 4:
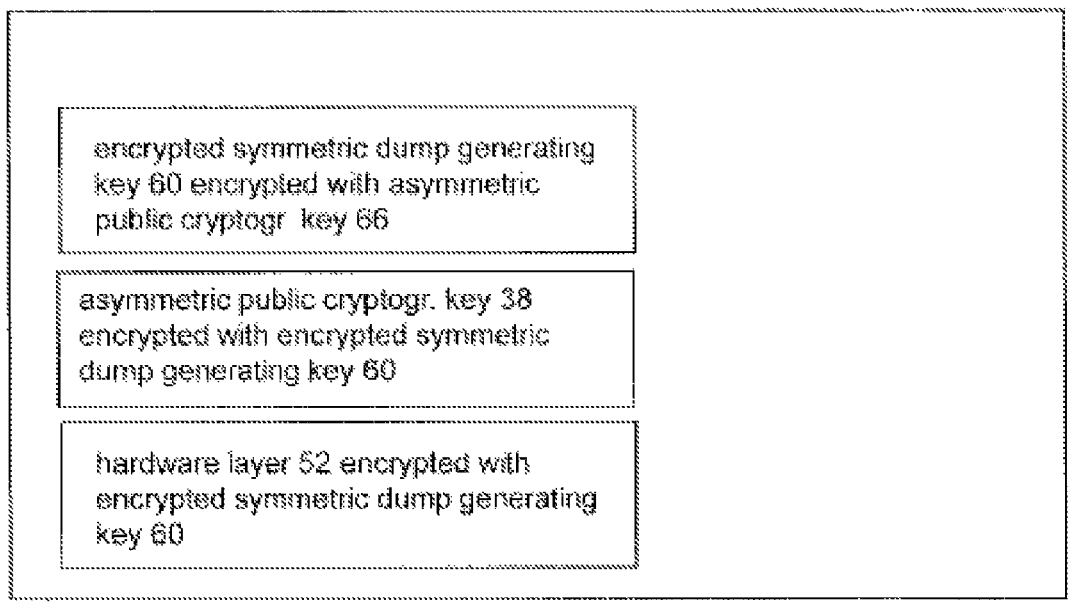
FIG. 4 shows a schematic overview of the encrypted virtual machine image.
Figure 5:
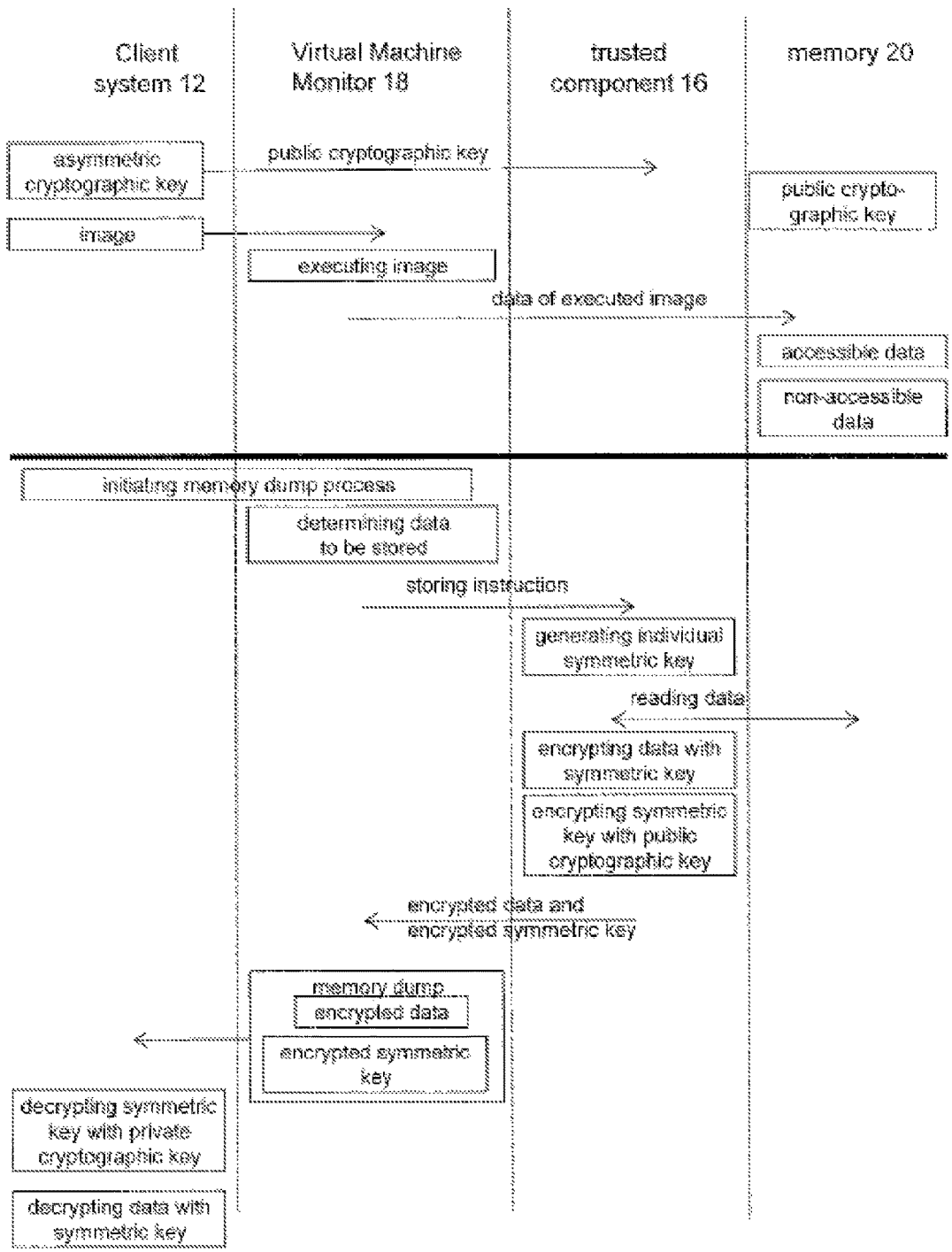
FIG. 5 shows a process diagram of a first embodiment of a method for generating a dump in a computer system according to FIG. 1.
Figure 8:
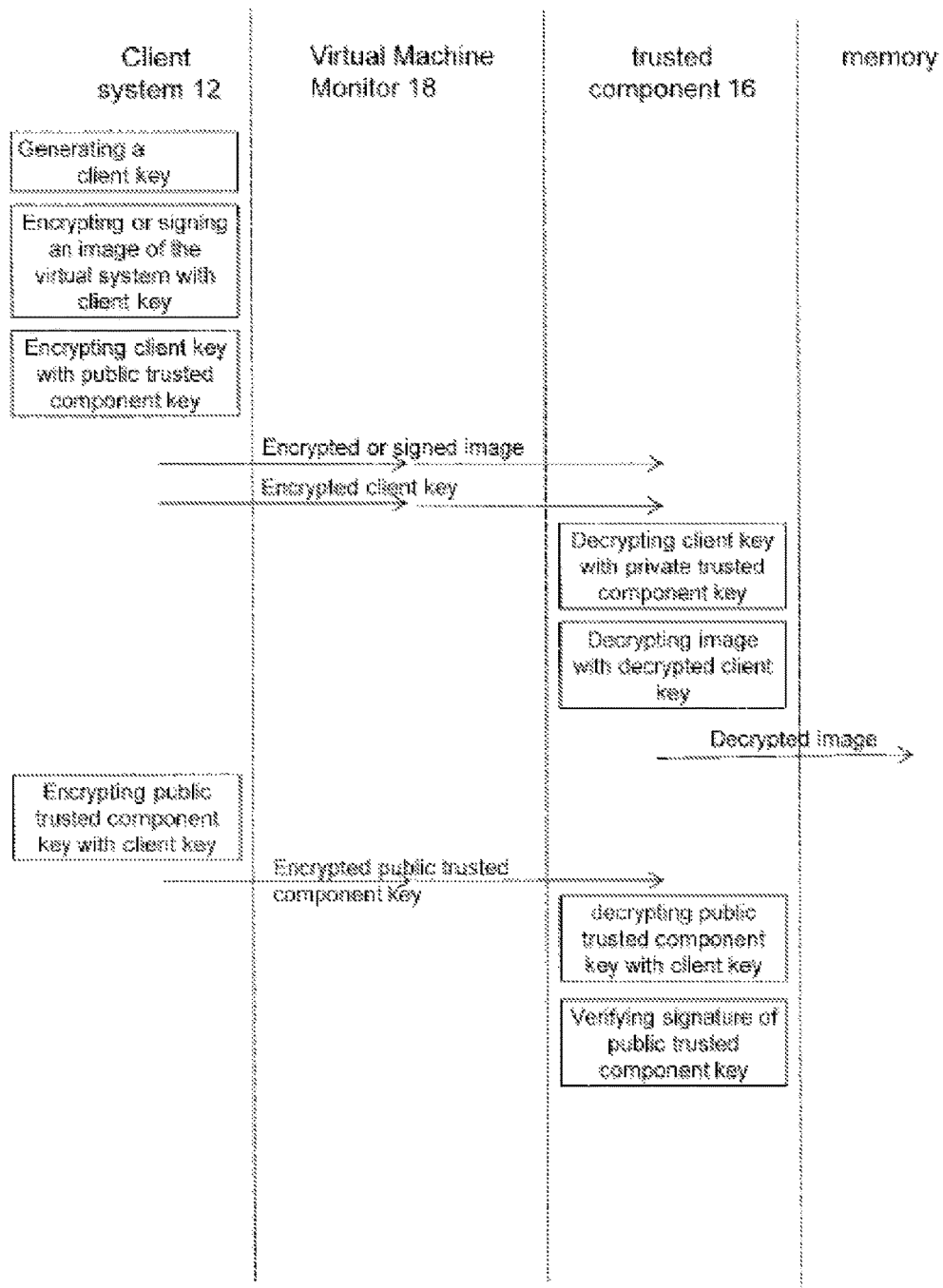
FIG. 8 shows a process diagram of a method for initiating the computer system according to FIG. 1.

For establishing the cryptographic link between the public cryptographic key of the client system and the virtual system being provided to the trusted component the client system generates a client key by, encrypts or signs an image of the virtual system with the client key, encrypts the client key with the public trusted component key by the client system and sends the encrypted or signed image and the encrypted client key from the client system to the virtual machine monitor (FIGS. 4 and 8).

The virtual machine monitor passes the encrypted image and the encrypted client key or the singed image and the encrypted client key to the trusted component when providing a protected execution environment for the virtual server.

The trusted component decrypts the encrypted client key by the trusted component, decrypts the encrypted image and stores it in the logical portion of the memory if the encrypted image is passed the trusted component.

Furthermore, the client system encrypts or signs the public cryptographic key with the client key before initiating the dump storing process the first time, sends the encrypted or signed public cryptographic key from the client system to the virtual machine monitor.

The virtual machine monitor passes the encrypted or signed public cryptographic key to the trusted component.

The trusted component decrypts the encrypted public cryptographic key using the client key by the trusted component, and verifies the signature of the signed public cryptographic key using the client key. In case of failing verification, the trusted component refuses to support subsequent dump storing processes of the virtual system by the trusted component.

The invention claimed is:

1. A method for generating a dump comprising data generated by a virtual system in a computing environment, the method comprising:
   initiating a dump process for dumping data being generated by the virtual system and stored in a guest memory;
   sending a dump request for the dump data from a virtual machine monitor to a trusted component;
   in response to receiving the dump request, generating a symmetric dump generating key by the trusted component;
   reading the dump data from the guest memory by the trusted component;
   encrypting the dump data with the symmetric dump generating key by the trusted component;
   encrypting the symmetric dump generating key with a public cryptographic key of the client system by the trusted component;
   providing the encrypted dump data and the encrypted symmetric dump generating key to the virtual machine monitor by the trusted component, wherein the trusted component generates a header of the data to be stored, the header comprising the encrypted dump generating key, a list of the encrypted dump data to be stored, the size of the encrypted dump data to be stored and a list of unencrypted dump data and a size of unencrypted dump data;
   the trusted component sending the header to the virtual machine monitor, the virtual machine monitor sending the header to the client, and then the virtual machine monitor sending the dump data to the client system after the dump data according to the header is accessible to the virtual machine monitor; and
   generating a dump comprising the encrypted dump data and the encrypted symmetric dump generating key by the virtual machine monitor; and
   providing the dump data to the client system by the virtual machine monitor.

2. The method of claim 1, wherein the dump data comprises accessible and non-accessible data for the virtual machine monitor, the non-accessible data being stored in encrypted form and/or stored in a protected memory area of the guest memory or registers, the accessible data being stored in unencrypted form and/or stored in a non-protected memory area of the guest memory, and wherein the method further comprises:
   the trusted component determining whether the dump data to be stored are accessible or non-accessible data, wherein the trusted component encrypts the non-accessible data; and
   the trusted component encrypting the non-accessible data and making the encrypted non-accessible data accessible to the virtual machine monitor, and the trusted component returns references to the accessible data unencrypted to the virtual machine monitor.

3. The method of claim 1, further comprising, prior to initiating the dump process:
   providing the virtual system in form of an image and a protected secret to the virtual machine monitor by the client system, wherein the protected secret is cryptographically linked to the image;
   generating a protected environment as a runtime environment for the virtual system by the virtual machine monitor;
   generating the guest memory by the virtual machine monitor;
   passing the protected secret from the virtual machine monitor to the trusted component, wherein the trusted component derives the protected secret from the protected secret;
   performing a consistency check with the protected secret by the trusted component;
   executing the virtual system by the virtual machine monitor in case the consistency check is performed successfully; and
   storing the dump data generated by the virtual system on the guest memory.

4. The method of claim 1, wherein the trusted component comprises an asymmetric cryptographic trusted component key pair comprising a private trusted component key and a public trusted component key, wherein the cryptographic link between the public cryptographic key of the client system and the virtual system is provided to the trusted component and established by the client system according to the method further comprising:

generating a client key by the client system;
encrypting or signing an image of the virtual system with the client key by the client system;
encrypting the client key with the public trusted component key by the client system;
sending the encrypted or signed image and the encrypted client key from the client system to the virtual machine monitor;
passing the encrypted image and the encrypted client key or the signed image and the encrypted client key from the virtual machine monitor to the trusted component when providing a protected execution environment for the virtual server;
decrypting the encrypted client key by the trusted component;
decrypting the encrypted image and storing it in a logical portion of the memory if the encrypted image is passed to the trusted component;
encrypting or signing the public cryptographic key with the client key by the client system before initiating the dump storing process a first time;
sending the encrypted or signed public cryptographic key from the client system to the virtual machine monitor;
passing the encrypted or signed public cryptographic key to the trusted component by the virtual machine monitor;
decrypting the encrypted public cryptographic key using the client key by the trusted component; and
verifying a signature of the signed public cryptographic key using the client key, and in case of a failing verification, not supporting subsequent dump storing processes of the virtual system by the trusted component.

5. The method of claim 1, further comprising:
the client system sending a dump request for initiating the dump process to the virtual machine monitor and passing the dump request from the virtual machine monitor to the trusted component.

6. The method of claim 1, further comprising:
the virtual machine monitor generating a dump request for initiating the dump process.

7. The method of claim 1, further comprising:
after receiving the dump request from the virtual machine monitor, the trusted component initiating a challenge-response authentication with the client system, wherein the challenge-response authentication uses the private and the public cryptographic key of the client system, and wherein the dump process is performed if the challenge-response authentication is successfully performed.

8. The method of claim 1, wherein the trusted component comprises a counter for the dumps generated by the virtual machine monitor, wherein a maximum number of dumps is defined, and the dump process is executed if a number of dumps generated by the virtual machine monitor is less than or equal to the maximum number of dumps.

9. The method of claim 8, further comprising:
providing an authenticated request by the client system for deactivating the counter in the trusted component.

10. A computing environment comprising:
a virtual machine monitor operatively coupled to a client system;
a trusted component; and
a memory;
wherein the client system is configured for providing a virtual system to the virtual machine monitor and having an asymmetric cryptographic key pair comprising a private cryptographic key and a public cryptographic key, wherein the public cryptographic key is cryptographically linked with the virtual system,
wherein the virtual machine monitor is configured for providing a protected environment for executing the virtual system provided by the client system and for declaring a guest memory as a logical portion of the memory, wherein dump data generated by virtual system is stored in the guest memory, and wherein a dump request is sent for the dump data from the virtual machine monitor to the trusted component,
wherein the trusted component having access to the public cryptographic key of the client system, is configured for, in response to receiving the dump request, generating an individual symmetric dump generating key for the dump data, accessing the dump data from the guest memory, encrypting the dump data with the symmetric dump generating key, encrypting the symmetric dump generating key with the public cryptographic key of the client system, generating a dump comprising the encrypted data and the encrypted symmetric dump generating key by the virtual machine monitor, providing the encrypted dump data and the encrypted symmetric dump generating key to the virtual machine monitor, and providing the dump to the client system by the virtual machine monitor,
wherein the trusted component is configured for generating a header of the data to the stored after receiving the dump request, the header comprising the encrypted dump generating key, a list of the encrypted dump data to be stored, the size of the encrypted dump data to be stored and possibly a list of unencrypted dump data and the size of unencrypted dump data, and the trusted component sends the header to the virtual machine monitor; and
wherein the virtual machine monitor is configured for sending the header and the dump data to the client system after the dump data according to the header is accessible to the virtual machine monitor.

11. The computing environment of claim 10, wherein the dump data comprises accessible and non-accessible data for the virtual machine monitor, wherein the non-accessible data is stored in encrypted form and stored in a protected memory area of the guest memory or registers, the non-accessible data being stored in unencrypted form and stored in a non-protected memory area of the guest memory, and the trusted component is configured for:
determining whether the dump data to be stored are accessible or non-accessible data for the virtual machine monitor;
encrypting the non-accessible data and making the encrypted non-accessible data accessible to the virtual machine monitor; and
returning references to the accessible data unencrypted to the virtual machine monitor.

12. The computing environment of claim 10, further comprising a server system, wherein the server system is configured for:
providing a virtual system to the virtual machine monitor and a protected secret by the client system, the protected secret being cryptographically linked to the image;
generating a protected environment as a runtime environment for the virtual system by the virtual machine monitor;

generating the guest memory by the virtual machine monitor;

passing the protected secret from the virtual machine monitor to the trusted component, wherein the trusted component derives the protected secret from the protected secret;

performing a consistency check with the protected secret by the trusted component;

executing the virtual system by the virtual machine monitor in case the consistency check is performed successfully; and storing the dump data generated by the virtual system in the guest memory.

13. The computing environment of claim 10, wherein the trusted component comprises an asymmetric cryptographic trusted component key pair comprising a private trusted component key and a public trusted component key, and the client system is configured for:

generating a client key;

encrypting or signing an image of the virtual system with the client key;

encrypting the client key with the public trusted component key;

sending the encrypted or signed image and the encrypted client key from the client system to the virtual machine monitor;

encrypting or signing the public cryptographic key with the client key before initiating the dump storing process a first time; and sending the encrypted or signed public cryptographic key from the client system to the virtual machine monitor, wherein the virtual machine monitor is configured for:

passing the encrypted image and the encrypted client key or the singed image and the encrypted client key to the trusted component when providing a protected execution environment for the virtual server; and passing the encrypted or signed public cryptographic key to the trusted component by the virtual machine monitor;

wherein the trusted component is configured for:

decrypting the encrypted client key, decrypting the encrypted image and storing it in a logical portion of the memory if the encrypted image is passed the trusted component, decrypting the encrypted public cryptographic key using the client key by the trusted component, and verifying a signature of the signed public cryptographic key using the client key, and in case of a failing verification, not supporting subsequent dump storing processes of the virtual system by the trusted component.

14. The computing environment of claim 10, wherein the client system is configured for sending a dump request initiating the dump process.

15. The computing environment of claim 10, wherein the virtual machine monitor is configured for generating a dump request initiating the dump process to the virtual machine monitor, passing the request from the virtual machine monitor to the trusted component.

16. The computing environment of claim 10, wherein the trusted component is configured for:

initiating a challenge-response authentication with the client after receiving the dump request from the virtual machine monitor, wherein the challenge-response authentication uses the private and the public cryptographic key of the client system; and performing the dump process only in case the challenge-response authentication is successfully performed.

17. The computing environment of claim 10, wherein the trusted component comprises a counter for the dumps generated by the virtual machine monitor, wherein a maximum number of dumps is defined, and the dump process is executed if a number of the dumps generated by the virtual machine monitor is less than or equal to the maximum number of dumps.

18. The computing environment of claim 17, the client system is configured for providing an authenticated request by the client system for deactivating the counter in the trusted component.

\* \* \* \* \*